United States Patent
Lee et al.

(10) Patent No.: US 6,807,173 B1
(45) Date of Patent: Oct. 19, 2004

(54) METHOD AND SYSTEM FOR IMPROVING BANDWIDTH AVAILABILITY IN A DATA COMMUNICATION NETWORK BY TOKENIZING MESSAGES

(75) Inventors: Enoch K. Lee, Dallas, TX (US);
Suvanee Chirachanchai, Plano, TX (US); Sanjoy Sen, Plano, TX (US);
Glenn C. Morrow, Plano, TX (US);
Don L. Jackson, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 741 days.

(21) Appl. No.: 09/644,400

(22) Filed: Aug. 23, 2000

(51) Int. Cl.$^7$ .................. H04L 12/66; G06F 15/16; G06F 7/00; H04Q 7/00
(52) U.S. Cl. .................. 370/389; 370/352; 370/328; 370/468; 707/101; 709/247
(58) Field of Search .................. 709/229, 222, 709/203, 218, 219, 228, 233, 237, 247, 246; 370/328, 389, 392, 468, 472, 477, 450, 338, 349; 704/9, 10, 1, 8; 707/101, 203

(56) References Cited

U.S. PATENT DOCUMENTS

| | | | |
|---|---|---|---|
| 5,627,829 A | * 5/1997 | Gleeson et al. | 370/230 |
| 5,850,526 A | * 12/1998 | Chou | 395/200.77 |
| 5,948,066 A | * 9/1999 | Whalen et al. | 709/229 |
| 6,163,811 A | * 12/2000 | Porter | 709/247 |
| 6,625,141 B1 | * 9/2003 | Glitho et al. | 370/352 |

\* cited by examiner

*Primary Examiner*—Hassan Kizou
*Assistant Examiner*—Hanh Nguyen
(74) *Attorney, Agent, or Firm*—John D. Crane; Dillon & Yudell LLP

(57) ABSTRACT

Because consuming extensive processor resources to directly compress textual messages for transmission in a data communication network is viewed as undesirable, a method of message compression in accordance with the present invention applies simple tokenization to certain fields in a message and then combines at least two of the tokens to produce a compact tokenized message that is up to 30% smaller than the original message. Thereafter, the tokenized message can optionally be compressed further utilizing a standard compression algorithm, such as Lempel-Ziv 1977 (LZ77), to attain a substantial compression ratio. Applying a standard compression scheme, such as LZ77, after tokenization is not as processor-intensive as direct compression of the original message and can decrease the message size by an additional 10%.

33 Claims, 2 Drawing Sheets

Request = Request-Line
    *( general-header
    | request-header
    | entity-header )
    CRLF
    [ message-body ]

Response = Status-Line
    *( general-header
    | request-header
    | entity-header )
    CRLF
    [ message-body ]

METHOD AND SYSTEM FOR IMPROVING BANDWIDTH AVAILABILITY IN A DATA COMMUNICATION NETWORK BY TOKENIZING MESSAGES

BACKGROUND OF THE INVENTION

1. Technical Field

The present invention relates in general to data communication and, in particular, to improving bandwidth availability in a data communication network. Still more particularly, the present invention relates to a method and system for improving bandwidth availability in a data communication network by tokenizing messages.

2. Description of the Related Art

Currently, there is great interest in leveraging the existing Internet infrastructure, protocols, and bandwidth to provide additional services beyond conventional data communication between computers. One area of particular interest is IP (Internet Protocol) telephony. In order to support IP telephony, two signaling standards have emerged, the H.323 protocol suite developed by ITU-T (International Telecommunication Union) and the Session Initiation Protocol (SIP) developed by the IETF (Internet Engineering Task Force). Both of these signaling protocols provide mechanisms for call establishment and teardown, call control and supplementary services, and capability exchange.

During VoIP (Voice over IP) call establishment, several control and set-up messages are exchanged before and/or during a call. These messages are similar in function for SIP and H.323, but very different in their formats. In particular, SIP messages are in text-based (using ISO 10646 in UTF-8 encoding), while H.323 messages are encoded utilizing ASN.1 PER (Packed Encoding Rules). The PER-encoded H.323 messages are more compact and therefore optimal for storage; however, they consume more CPU processing cycles than SIP text messages because of the need to encode and decode the messages. In contrast, the SIP messages, being text, are efficient in terms of processing cycles, but do not make as efficient use of storage or the bandwidth of communication links, such as the mobile-to-base station air interface or dial-up modem connections, which are characterized by low bandwidth and high error rates.

Consequently, the present invention includes a recognition that it would be desirable to reduce the sizes of SIP messages to better utilize low bandwidth connections in data communication networks.

SUMMARY OF THE INVENTION

Although shorter SIP messages can be obtained, for example, by directly applying standard LZ77 (Lempel-Ziv 1977) schemes such as gzip or winzip, processor-intensive compression and decompression cycles would be required as for PER-encoded H.323. Because consuming processor resources to directly compress textual SIP messages is viewed as undesirable, the present invention applies simple tokenization to certain terms and fields in a SIP message to produce a compact tokenized message that is up to 30% smaller than the original message. Thereafter, the tokenized messages can optionally be compressed further utilizing a standard compression algorithm, such as LZ77, to attain a substantial compression ratio. Applying a standard compression scheme, such as LZ77, after tokenization can decrease the SIP message size by an additional 10%.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
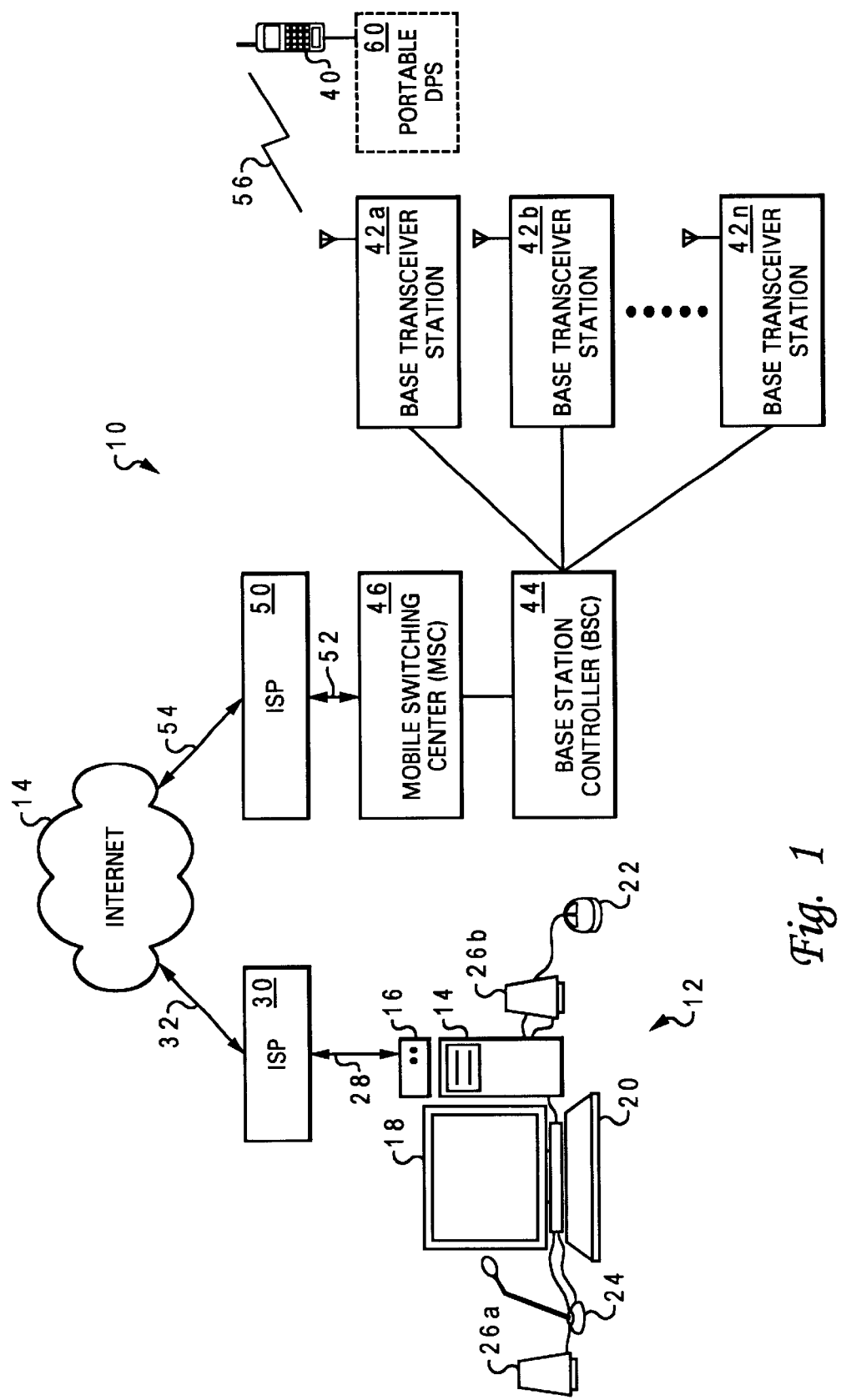
FIG. 1 depicts an illustrative embodiment of a data communication network with which the method and system of the present invention may advantageously be utilized.

With reference now to the figures and in particular with reference to FIG. 1, there is depicted a high-level block diagram of a data communication network 10 with which the-present invention may advantageously be utilized. As illustrated, data communication network 10 includes a desktop computer system 12, having a processing unit 14, a display 18, a keyboard 20, mouse 22, microphone 24, and speakers 26a and 26b. Computer system 12 also includes a telephony modem 16 (which could alternatively be an internal modem) through which computer system 12 may establish a dial-up connection 28 to Internet Service Provider (ISP) 30, which in turn provides computer system 12 with a high bandwidth connection 32 to Internet 14. As will be appreciated by those skilled in the art, dial-up connection 28 supported by modem 16 is typically a low bandwidth connection having a data rate of 33.6 kilobits/second or 56 kilobits/second.

Data communication network 10 also includes a mobile 40 that provides a mobile user wireless data (including voice) communication with a cellular (e.g., Code Division Multiple Access (CDMA) or Personal Communication Services (PCS)) network that generally includes a number of base transceiver stations 42a–42d, a base station controller 44, and a mobile switching center (MSC) 46. MSC 46 is in turn connected to Internet 14 via a second ISP 50 so that mobile 40 can receive data from and transmit data to Internet 14. In a typical embodiment, connections 52 and 54 between MSC 46 and ISP 50 and between ISP 50 and Internet 14 have a much higher bandwidth than the air link 56 between mobile 40 and base transceiver station 42a. As shown, mobile 40 may also optionally be connected to a portable data processing system (DPS) 60, such as a laptop or palmtop computer, a personal digital assistant (PDA), or the like.

As described supra, SIP, which is defined by M. Handley et al., *SIP. Session Initiation Protocol*, RFC 2543, March 1999 (incorporated herein by reference in its entirety), provides the necessary protocol mechanisms so that end systems, such as mobile 40 (or portable DPS 60) and computer system 12, and intermediate proxy servers can provide telephony services over IP networks such as Internet 14. The telephony services supported by SIP include call forwarding, callee and calling identifier (e.g., number) delivery, personal mobility (i.e., the ability to reach a called party under a single, location-independent address even when the user changes end systems), terminal-type negotiation and selection (e.g., a caller can be given a choice to reach the party via Internet telephony, mobile phone, an answering service, etc.), terminal capability negotiation, caller and callee authentication, call transfer, and invitations to multicast conferences. Thus, by utilizing the telephony services of SIP, a user of computer system 12 and a user of mobile 40 (and/or portable DPS 60) can communicate data (including voice data) via Internet 14.

It should be noted as an aside that SIP runs at the Session layer of the ISO/OSI (International Organization for Standardization/Open System Interconnection) model and is independent of the underlying protocols. Thus, although SIP typically is implemented over UDP (User Datagram Protocol) or TCP (Transmission Control Protocol) (e.g., within Internet 14), SIP can also be run over other network architectures, such as IPX (Interenetwork Packet Exchange), frame relay, and ATM (Asynchronous Transfer Mode).

Figures 2A, 2B, 3:
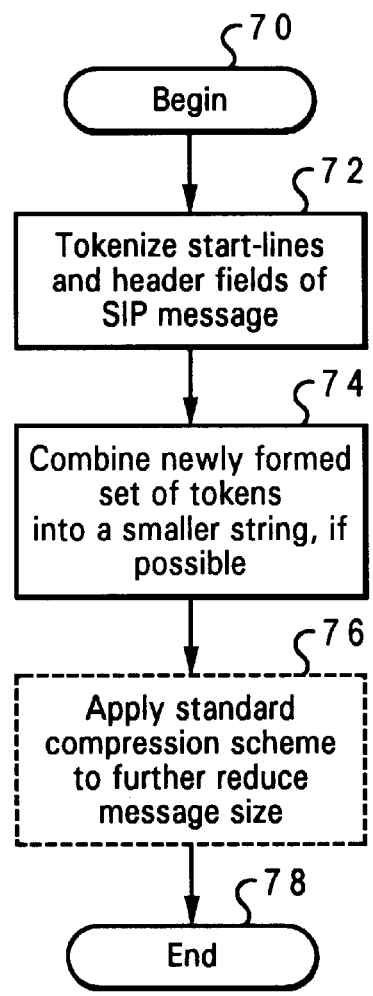
FIGS. 2A and 2B respectively illustrate the formats of SIP Request and Response messages.
FIG. 3 is a high level logical flowchart of a method for compressing a SIP message in accordance with the present invention.

In the embodiment of data communication network 10 shown in FIG. 1, the bandwidth utilization by SIP of low bandwidth data connections, such as dial-up connection 28 and air link 56, is advantageously reduced by tokenizing the SIP messages. A SIP message is defined in RFC 2543 as "either a request from a client to a server, or a response from a server to a client." As illustrated in FIGS. 2A and 2B, SIP requests and responses have similar structures in that each contains a start-line (i.e., a request-line for requests and a status-line for responses), one or more header fields ("headers"), an empty line (i.e., a line containing only a carriage-return, line-feed (CRLF)) indicating the end of the header fields, and an optional message body (also called an "entity"). In a preferred embodiment of the present invention, SIP messages are compressed to preserve the bandwidth of low bandwidth connections by tokenizing the SIP messages.

Referring now to FIG. 3, there is depicted a high level logical flowchart of an exemplary method by which a SIP client, server, or proxy compresses SIP messages in accordance with the present invention. For example, the method of FIG. 3 may be performed by a SIP client executed by one of computer system 12, mobile 40, or portable data processing system 60 prior to transmitting a SIP message to data communication network 10 via dial-up connection 28 or air link 56. The method of FIG. 3 may also be performed, for example, by a SIP server or proxy executing at a hardware server of ISP 30 or BSC 44 prior to transmitting a SIP message via dial-up connection 28 or air link 56. When configured to perform the method of FIG. 3, any combination of software and/or hardware (e.g., mobile 40 running a SIP client) utilized to perform the method is defined herein as a message compressor.

As illustrated, the method of FIG. 3 begins at block 70 and thereafter proceeds to block 72, which illustrates the message compressor tokenizing the start-lines and header fields of a SIP message, for example, by reference to pre-defined token tables. Next, at block 74, if possible, the message compressor combines tokens within the newly formed set of tokens into a smaller tokenized string, thereby achieving further compression. Finally, as depicted at block 76, the message compressor may optionally apply any standard compression scheme (as indicated by dashed-line illustration) to achieve further reduction in the SIP message size. Exemplary compression schemes that may be employed include the well-known LZ77 compression schemes (e.g., gzip and winzip) and the recommendation by 3rd Generation Partnership Project (3GPP), which is described in "Compression algorithm for text messaging services", 3G TS 23.042 v3.0.0, July 1999 (incorporated herein by reference). Thereafter, the compression process illustrated in FIG. 3 ends at block 78, at which time the compressed SIP message is ready for transmission via a connection of data communication network 10.

In a preferred embodiment, SIP messages are not compressed for end-to-end communication (e.g., between computer system 12 and mobile 40), but are instead compressed for transmission across relatively low bandwidth connections (e.g., dial-up connection 28 and air link 56) of data communication network 10. Thus, in this preferred embodiment, SIP messages are compressed only during communication between the message compressor (e.g., a SIP server, proxy or agent executed by desktop computer system 12, mobile 40, BSC 44, a server of ISP 30, etc.) and a message decompressor (e.g., a SIP server, proxy or agent executed by desktop computer system 12, mobile 40, BSC 44, a server of ISP 30, etc.). Upon receipt by the message decompressor, the SIP message can be decompressed by simply reversing each of steps 76, 74 and 72 of FIG. 3.

In order to provide greater understanding of the present invention, a detailed pseudo-code of an exemplary compression routine that embodies the high level flow depicted in FIG. 3 is given below. In the following pseudo-code, Steps 1–2 correspond to block 72 of FIG. 3, Steps 3 and 4 correspond to block 74, and Step 5 corresponds to block 76. Each of Steps 1–4 follows the following two rules:

Rule 0. Do not process any structure below the Authorization header, if it exists.

Rule 1. Do not process any structure that is already encrypted.

Compression Routine Pseudo-code

Step 1.

Header compaction

For each message header, combine multiple lines (if any) into a single line ending with a single "Carriage Return" (CR). Note that this step does not include the message body.

Step 2.

Simple tokenization

Step 2.1

Replace each of the header field names (field names are not case-sensitive) by a token as illustrated in Table I, except those header field names which are already in compact form (as shown with an asterisk (*) in Table I).

TABLE I

| Header Fields | Tokens |
| --- | --- |
| Accept | p |
| Accept-Encoding | d |
| Accept-Language | g |
| Allow | a |
| Authorization | z |
| Call-ID* | i |
| Contact* | m |
| Content-Encoding* | e |
| Content-Length* | l |
| Content-Type* | c |
| Cseq | q |
| Date | b |
| Encryption | y |
| Expires | x |
| From* | f |
| Hide | h |
| Max-Forwards | w |
| Organization | o |
| Proxy-Authenticate | r |

TABLE I-continued

| Header Fields | Tokens |
|---|---|
| Proxy-authorization | 0 |
| Proxy-Require | j |
| Priority | 1 |
| Require | n |
| Retry-After | 2 |
| Response-Key | k |
| Record-Route | 3 |
| Route | 4 |
| Server | 5 |
| Subject* | s |
| Timestamp | 6 |
| To* | t |
| Unsupported | 7 |
| User-Agent | u |
| Via* | v |
| Warning | 8 |
| WWW-Authenticate | 9 |

Step 2.2
For Request messages, which have a start-line formatted as:
Request-Line=Method SP Request-URI SP SIP-Version CRLF (where SP is the Space character and CRLF is Carriage Return, Line Feed)
Step 2.2.1
Replace the Method appearing in the Request-Line with its

TABLE II

| Methods | Tokens |
|---|---|
| INVITE | I |
| ACK | A |
| OPTIONS | O |
| BYE | B |
| CANCEL | C |
| REGISTER | R |

Step 2.2.2. Replace the SIP-version "SIP/2.0" in the Request-Line by "Z".
Step 2.3
For Response messages, which have a Status-Line as follows:
Status-Line=SIP-version SP Status-Code SP Reason-Phrase CRLF
Step 2.3.1
Replace the SIP-version "SIP/2.0" in the Status-Line by "Z".
Step 2.3.2
Delete the Reason-Phrase associated with the Status-Code if the Reason-Phrase matches with the recommendation listed in RFC 2543 for the Status-Code. If not, do nothing. For example, remove the Reason-Phrase "Trying" associated with the Status-Code "100". (Note that the Reason-Phrases such as, "Trying", listed in RFC 2543 are recommended, not required, and may be replaced by a local equivalent without affecting the protocol. The Reason-Phrase is intended for the human user only.)
Step 2.3.3
Replace the Status-Code appearing in RFC 2543 with a character from {0–9,a–z,A–H} by the order of the numeric value of the Status-Code. If it is not listed in RFC 2543, do nothing. For example, Status-Codes 180 and 401 for "Ringing" and "Unauthorized" are replaced by 1 and b, respectively.

Step 2.4
Replace each parameter and the pre-defined value (if it exists) by the associated tokens listed in Table III, below. In Table III, the format for parameters and values is <parameter>=<value>. Except in Content-Type there is no value nor "=" following the parameters "application/sdp" and "text/html". The values "SIP/2.0/UDP" and "SIP/2.0/TCP" are the sent-protocol value in the Via message header. The second column is the parameter of the corresponding header field, while the fourth column contains some of the choices associated with the parameter. In the fourth and fifth columns, labeled "Values" and "Tokens," respectively, blank cells mean the values and tokens are-not-pre-defined.

TABLE III

| Tokenized Header Fields | Parameters | Tokens | Values | Tokens |
|---|---|---|---|---|
| z (Authorization) | PGP version | p | | |
| | signature | s | | |
| | realm | r | | |
| | nonce | n | | |
| | sign-by | b | | |
| m (Contact) | action | a | proxy | p |
| | | | redirect | r |
| | expires | e | | |
| c (Content-Type) | application/sdp | a | | |
| | text/html | t | | |
| y (Encryption) | PGP version | p | | |
| | encoding | e | ascii | a |
| f (From) | tag | t | | |
| 2 (Retry-After) | duration | d | | |
| t (To) | tag | t | | |
| v (Via) | received | r | SIP/2.0/UDP | u |
| | branch | b | SIP/2.0/TCP | t |
| | madd | m | | |
| | ttl | t | | |
| 9 (WWW-Authenticate) | realm | r | | |
| | version | v | | |
| | algorithm | a | md5 | m |
| | | | sha1 | s |
| | nonce | n | | |

Step 2.5
Replace each SDP (Session Description Protocol) value, which indicates the type of session, by the associated token listed below in Table IV. Details regarding SDP structures can be found, for example, in M. Handley and V. Jacobson, "SDP: Session Description Protocol", RFC 2327, April 1998, which is incorporated herein by reference.

TABLE IV

| Types | Values | Tokens |
|---|---|---|
| a | cat | c |
| | keywds | k |
| | tool | t |
| | ptime | p |
| | recvonly | r |
| | sendrecv | v |
| | sendonly | y |
| | orient | o |
| | type | e |
| | charset | h |
| | sdplang | s |
| | lang | l |
| | framerate | f |
| | quality | q |
| | fmtp | m |
| | rtpmap | z |

TABLE IV-continued

| Types | Values | Tokens |
|---|---|---|
| k | clear | c |
|   | base64 | b |
|   | uri | u |
|   | prompt | p |
| m | audio | a |
|   | video | v |
|   | application | p |
|   | data | d |
|   | control | c |
|   | RTP/AVP | r |
|   | udp | u |

Step 2.6

In the SIP message body, if the SDP time field (i.e., "t=<start time> <stop time>") exists, replace the numeric value of <stop time> by the difference of <start time> and <stop time>. (Note that these time values are the decimal representation of Network Time Protocol (NTP) time values in seconds.)

Step 3

Grouping of tokens

Re-order message headers following the order specified below in Table V.

(Note that two clusters of message headers are possibly formed, the first one (let us call this Cluster 1) consists of message headers from Table V while the other cluster (Cluster 2) consists of messages headers not in Table V.) When re-ordering the message headers, apply Rules 2 and 3:

Rule 2. Cluster 1 headers always appear before Cluster 2 headers.

Rule 3. If there are more than one Via message headers, do not alter the order among the Via message headers. Gather these Via message headers, preserving their intrinsic order, and consider the all Via headers as a single header.

TABLE V

| Header Fields |
|---|
| f (From) |
| t (To) |
| q (Cseq) |
| i (Call-ID) |
| c (Content-Type) |
| v (Via) |

Step 4

Further compression of header fields

Replace the tokens and the delimiter ":" from each of the message headers in Cluster 1 with a 2-character string from {0–9, a–z, A–Z, #, $}:

Step 4.1. Create the first character of the 2-character string:

Step 4.1.1

Create a 6-bit bitmap out of Cluster 1 using the ordered set {f; t, q, i, c, v} specified in Table V.

(a) For each token from the ordered set {f, t, q, i, c, v}, find whether it appears in Cluster 1.

(b) If it appears, assign a "1" in the corresponding position of the bitmap. Otherwise assign a "0".

Step 4.1.2

The decimal equivalent of this bitmap is mapped to one of the ASCII characters in the set {0–9,a–z,A–Z,#, $}.

For example, Steps 4.1.1 and 4.1.2 perform the following transformations:

"tc"$\leftrightarrows 010010_2=18_{10}\leftrightarrows$"i" and "ficv"$\leftrightarrows 110011_2=51_{10}\leftrightarrows$"P")

Step 4.2

For the second character, count the number of appearances of the Via header fields. The ASCII character corresponding to this number is used as the second character of the 2-character string. (Step 4.2 assumes that this number will be, for all practical purposes, less than 128.)

Step 5

Apply a compression routine, such as LZ77 or the 3GPP-recommended text message compression algorithm referenced above, to the resultant string to achieve a higher compression ratio.

To illustrate the application of the exemplary pseudo-code compression routine set forth above, consider the following uncompressed SIP Request:

INVITE sip:t.watson@ieee.org SIP/2.0
Via: SIP/2.0/UDP nortelnetworks.com; branch=8348
maddr=239.128.16.254;ttl=16
Via: SIP/2.0/UDP bnr.com
Authorization: PGP version=5.0, signature= . . .
From: J. Roth <sip:johnroth@nortelnetworks.com>
To: T. Watson <sip:t.watson@ieee.org>
Call-ID: 31415@nortelnetworks.com
CSeq: 1 INVITE
Content-Type: application/sdp
Content-Length: 51
v=0
c=IN IP4 63.86.21.87
m=audio 8020 RTP/AVP 0

Applying Step 1 from the routine to multiple-line header fields reduces the first Via header field to a single line terminating with a CR as follows:

Via: SIP/2.0/UDP nortelnetworks.com; branch=8348; maddr=239.128.16.254; ttl=16

Next, the application of Step 2 tokenizes header field names, method fields, status codes, parameters/values, SDP values, and user defined strings by reference to Tables I–IV as follows:

I sip:t.watson@ieee.org Z
v: u nortelnetworks.com; b=8348; m=239.128.16.254;t=16
v: u bnr.com
z: p=5.0, s= . . .
From: J. Roth <sip:johnroth@nortelnetworks.com>
To: T. Watson <sip:t.watson@ieee.org>
Call-ID: 31415@nortelnetworks.com
CSeq: 1 INVITE
Content-Type: application/sdp
Content-Length: 51
v=0
c=IN IP4 63.86.21.87
m=audio 8020 RTP/AVP 0

Following Step 2, re-ordering of header fields according to Step 3 is considered. However, in the present example, Via headers, which must be kept in order according to Rule 3, are the only message headers from Table V appearing above the Authorization header. Thus, according to Rule 0, Step 3 does not modify the already changed SIP message. Rule 4, however, may be utilized to further compress the header fields of the SIP message as follows:

I sip:t.watson@ieee.org Z
12
u nortelnetworks.com; b=8348; m=239.128.16.254;t=16
u bnr.com
z: p=5.0, s= . . .
From: J. Roth <sip:johnroth@nortelnetworks.com>
To: T. Watson <sip:t.watson@ieee.org>
Call-ID: 31415@nortelnetworks.com
CSeq: 1 INVITE
Content-Type: application/sdp
Content-Length: 51
v=0
c=IN IP4 63.86.21.87
m=audio 8020 RTP/AVP 0

Thereafter, Step 5 may be performed by applying gzip or another conventional compression algorithm.

SIP Message Decompression

Decompression of a SIP message compressed by the five step process set forth above can be accomplished by the precise reversal (in order) of only Steps 5, 4 and 2 of the compression algorithm. Steps 1 and 3 need not be reversed in the decompression procedure. As a result, the decompressed SIP message may or may not be an exact duplicate of the original SIP message, but will be a functional equivalent. For example, decompression of the exemplary compressed SIP Request set forth above yields:

INVITE sip:t.watson@ieee.org SIP/2.0
Via: SIP/2.0/UDP nortelnetworks.com; branch= 8348;maddr=239.128.16.254;ttl=16
Via: SIP/2.0/UDP bnr.com
Authorization: PGP version=5.0, signature= . . .
From: J. Roth <sip:johnroth@nortelnetworks.com>
To: T. Watson <sip:t.watson@ieee.org>
Call-ID: 31415@nortelnetworks.com
CSeq: 1 INVITE
Content-Type: application/sdp
Content-Length: 51
v=0
c=IN IP4 63.86.21.87
m=audio 8020 RTP/AVP 0

Table VI below summarizes additional examples of SIP message compression in accordance with the present invention. Together with each example, the compression ratios achieved with and without the use of gzip compression (Step 5) are given. As shown, typical compression ratios without the optional gzip compression range between 22% and 35%, while typical compression rations with the optional gzip compression range between 32% and 47%.

TABLE VI

| Original SIP Message | Optimized SIP Message | Compression Ratio no gzip | Compression Ratio gzip |
|---|---|---|---|
| SIP/2.0 180 Ringing<br>From: J. Roth <sip:johnroth@nortelnetworks.com><br>To: T. Watson <sip:t.watson@ieee.org><br>Call-ID: 31415@nortelnetworks.com<br>CSeq: 1 INVITE<br>Via: SIP/2.0/UDP nortelnetworks.com<br>Content-Length: 0 | Z1<br>Z1<br>J. Roth <sip:johnroth@nortelnetworks.com><br>T. Watson <sip:t.watson@ieee.org><br>1 I<br>31415@nortelnetworks.com<br>u nortelnetworks.com<br>1: 0 | 32% | 40% |
| INVITE sip:t.watson@ieee.org SIP/2.0<br>To: T. Watson <sip:t.watson@ieee.org><br>Via: SIP/2.0/UDP nortelnetworks.com<br>From: J. Roth <sip:johnroth@nortelnetworks.com><br>Call-ID: 31415@nortelnetworks.com<br>CSeq: 1 INVITE<br>Content-Type: application/sdp<br>Content-Length: 51<br><br>v=0<br>c=IN IP4 63.86.21.87<br>t=2873397496 2873404696<br>m=audio 8020 RTP/AVP 0 | I sip:t.watson@ieee.org Z<br>$1<br>J. Roth <sip:johnroth@nortelnetworks.com><br>T. Watson <sip:t.watson@ieee.org><br>1 I<br>31415@nortelnetworks.com<br>a<br>u nortelnetworks.com<br>1: 51<br><br>v=0<br>c=IN 1P4 63.86.21.87<br>t=2873397496 7200<br>m=a 8020 r 0 | 33% | 47% |
| ACK sip:t.watson@ieee.org SIP/2.0<br>Via: SIP/2.0/UDP ieee.org<br>Authorization: PGP version=5.0, signature=. . .<br>From: J. Roth <sip:johnroth@nortelnetworks.com><br>To: T. Watson <sip:t.watson@ieee.org><br>Call-ID: 31415@nortelnetworks.com<br>CSeq: 1 ACK | A sip:t.watson@ieee.org Z<br>11<br>u ieee.org<br>z: p=5.0, s=. . .<br>From: J. Roth <sipjohnroth@nortelnetworks.com><br>To: T. Watson <sip:t.watson@ieee.org><br>Call-ID: 31415@nortelnetworks.com<br>Cseq: 1 A | 22% | 32% |

TABLE VI-continued

| Original SIP Message | Optimized SIP Message | Compression Ratio | |
|---|---|---|---|
| | | no gzip | gzip |
| SIP/2.0 200 OK<br>From: Alice <sip:Alice@nortelnetworks.com><br>To: Bob <sip:bob@somewhere.com>; tag=376363656<br>Call-ID: 1234@nortelnetworks.com<br>Content-Length: 81<br>Content-Type: application/sdp<br><br>v=0<br>m=audio 0 RTP/AVP 0 1 3 99<br>m=video 0 RTP/AVP 31 34<br>a=rtpmap:99 SX7300/8000 | Z 4<br>S0<br>Alice <sip:Alice@nortelnetworks.com><br>Bob <sip:bob@somewhere.com>; t=376363656<br>1234@nortelnetworks.com<br>a<br>1: 81<br><br>v=0<br>m=a 0 r 0 1 3 99<br>m=v 0 r 31 34<br>a=z:99 SX7300/8000 | 35% | 40% |

As has been described, the present invention provides an improved method and system for compressing and decompressing data communication messages. In an embodiment in which the messages to be compressed comprise SIP messages, an exemplary compression method in accordance with the present invention reduces the size of individual header fields by combining the multiple lines of such headers into a single line ending with a single Carriage Return. Simple tokenization is then applied to header field names, method fields, status codes, parameters/values, SDP values, and user defined strings according to predefined token tables. If present, the SDP time field is also simplified. Selected message headers are then reordered for grouping purposes, and the newly combined header field names are replaced by a character string. Thereafter, a conventional compression algorithm can optionally be applied to further compress the message size at the cost of additional compression and decompression processing. Advantageously, the good compression rate typically achieved by the present invention is simple and requires few CPU processing cycles since compression and decompression are predominately performed by reference to token tables.

While the invention has been particularly shown and described with reference to a preferred embodiment, it will be understood by those skilled in the art that various changes in form and detail may be made therein without departing from the spirit and scope of the invention. In particular, while a preferred embodiment of the present invention compresses SIP messages, those skilled in the art will appreciate that the present invention can also be applied to the compression of other message types. In addition, it should be recognized that the specific tokenization summarized in the above tables is merely exemplary and that other and different message fields can be tokenized in like manner and that different binary, ASCII or other alphanumeric tokens may be utilized to represent such message fields within the scope of the present invention.

Furthermore, although aspects of the present invention have been described with respect to computer systems, mobiles and other data processing systems executing software, such as SIP clients, servers and proxies, that direct the functions of the present invention, it should be understood that present invention may alternatively be implemented as a program product for use with the above-mentioned and other data processing systems. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding program instructions that direct the functions of the present invention, represent alternative embodiments of the present invention.

What is claimed is:

1. A method for processing a message suitable for transmission via a data communication network, said method comprising:

mapping each of one or more fields present in the message with a respective tokens;

after said mapping, determining at least one token representing a field that is present in the message and at least one token representing a field that is absent from the message;

in response to said determining, mapping said at least one token representing a field that is present in the message to a first character of a character string and mapping said at least one token representing a field that is absent from the message to a second character of the character string; and replacing the one or more fields present in the message with the character string to obtain a compressed message.

2. The method of claim 1, and further comprising after said replacing further compressing the compressed message.

3. The method of claim 2, wherein further compressing the compressed message comprises further compressing the compressed message utilizing a Lempel-Ziv compressor.

4. The method of claim 1, and further comprising:

if the message contains a header field containing multiple lines, combining the multiple lines into a single line in the header field.

5. The method of claim 1, wherein the message is a textual message, and wherein replacing fields in the message comprises replacing textual field identifiers tokens.

6. The method of claim 1, wherein the message is a Session Initiation Protocol (SIP) message.

7. The method of claim 1, wherein replacing fields in the message comprises replacing at least one method field.

8. The method of claim 1, wherein replacing fields in the message comprises replacing at least one message parameter name.

9. The method of claim 8, wherein replacing fields in the message further comprises replacing at least one parameter value.

10. The method of claim 1, wherein replacing fields in the message comprises replacing at least one session description value.

11. The method of claim 10, wherein replacing at least one session description value comprises replacing a Session Description Protocol (SDP) value.

12. The method of claim 1, and further comprising re-ordering at least two header fields in the message prior to said replacing.

13. The method of claim 1, and further comprising:
transmitting the compressed message via a data communication network; and
following the transmitting, receiving and decompressing the compressed message.

14. The method of claim 13, wherein said decompressing comprises decompressing the compressed message at an intermediate location disposed between terminals of an end-to-end communication session.

15. A method for processing a message suitable for transmission via a data communication network, said method comprising:
replacing fields in the message with tokens;
re-ordering at least two header fields in the message;
after said re-ordering, combining at least two of said tokens into a character string to obtain a compressed message, wherein said combining includes combining tokens representing header fields into the character string according to both which headers are present and which headers are absent from the message.

16. A method for processing a message suitable for transmission via a data communication network, said method comprising:
replacing fields in the message with tokens;
re-ordering at least two header fields in the message;
after said re-ordering, combining at least two of said tokens into a character string to obtain a compressed message, wherein said combining includes combining tokens representing header fields into the character string according to a number of instances of a header field in the message.

17. A message compressor for compressing a message to obtain a compressed message suitable for transmission via a data communication network, said message compressor comprising:
means for mapping each of one or more fields present in the message with a respective tokens;
means for, after said mapping, determining at least one token representing a field that is present in the message and at least one token representing a field that is absent from the message;
means, responsive to said determining, for mapping said at least one token representing a field that is present in the message to a first character of a character string and mapping said at least one token representing a field that is absent from the message to a second character of the character string; and
means for replacing the one or more fields present in the message with the character string to obtain a compressed message.

18. The message compressor of claim 17, further comprising means for further compressing the compressed message.

19. The message compressor of claim 17, wherein the means for further compressing the compressed message comprises a Lempel-Ziv compressor.

20. The message compressor of claim 17, wherein the message includes a header field having multiple lines, the message compressor further comprising means for combining the multiple lines into a single line in the header field.

21. The message compressor of claim 17, wherein the message compressor comprises a Session Initiation Protocol (SIP) message compressor.

22. The message compressor of claim 17, wherein the means for replacing fields in the message comprises means for replacing at least one method field.

23. The message compressor of claim 17, wherein the means for replacing fields in the message comprises means for replacing at least one message parameter name.

24. The message compressor of claim 23, wherein the means for replacing fields in the message further comprises means for replacing at least one parameter value.

25. The message compressor of claim 17, wherein the means for replacing fields in the message comprises means for replacing at least one session description value.

26. The message compressor of claim 25, wherein the means for replacing at least one session description value comprises means for replacing a Session Description Protocol (SDP) value.

27. The message compressor of claim 17, and further comprising means for re-ordering at least two header fields in the message prior to said replacing.

28. The message compressor of claim 17, wherein the message compressor comprises a wireless mobile.

29. The message compressor of claim 17, wherein the message compressor comprises a SIP proxy server.

30. The message compressor of claim 17, wherein the message compressor comprises a base station controller.

31. The message compressor of claim 17, wherein the message compressor comprises a data processing system.

32. A message compressor for compressing a message to obtain a compressed message suitable for transmission via a data communication network, said message compressor comprising:
means for replacing fields in the message with tokens;
means for re-ordering at least two header fields in the message; and
means for, after said re-ordering, combining at least two of said tokens into a character string to obtain a compressed message, wherein the means for combining includes means for combining tokens representing header fields into the character string according to both which headers are present and which headers are absent from the message.

33. A message compressor for compressing a message to obtain a compressed message suitable for transmission via a data communication network, said message compressor comprising:
means for replacing fields in the message with tokens;
means for re-ordering at least two header fields in the message; and
means for, after said re-ordering, combining at least two of said tokens into a character string to obtain a compressed message, wherein the means for combining includes means for combining tokens representing header fields into the character string according to a number of instances of a header field in the message.

* * * * *